(12) United States Patent
Michael

(10) Patent No.: US 7,072,876 B1
(45) Date of Patent: Jul. 4, 2006

(54) SYSTEM AND METHOD FOR MINING EXECUTION TRACES WITH FINITE AUTOMATA

(75) Inventor: Christoph Cornelius Michael, Reston, VA (US)

(73) Assignee: Cigital, Dulles, VA (US)

(*) Notice: Subject to any disclaimer, the term of this patent is extended or adjusted under 35 U.S.C. 154(b) by 712 days.

(21) Appl. No.: 09/955,165

(22) Filed: Sep. 19, 2001

Related U.S. Application Data

(60) Provisional application No. 60/233,475, filed on Sep. 19, 2000.

(51) Int. Cl.
*G06F 17/00* (2006.01)
*G06N 5/00* (2006.01)

(52) U.S. Cl. .............................. 706/45; 706/14; 706/12
(58) Field of Classification Search ................. 706/45, 706/14, 12; 717/135
See application file for complete search history.

(56) References Cited

U.S. PATENT DOCUMENTS

| | | | |
|---|---|---|---|
| 6,668,249 B1* | 12/2003 | Kase et al. .................... 706/45 |
| 6,742,015 B1* | 5/2004 | Bowman-Amuah ......... 718/101 |
| 6,751,661 B1* | 6/2004 | Geddes ........................ 709/223 |
| 6,799,169 B1* | 9/2004 | Coffman et al. .............. 706/11 |
| 2003/0121027 A1* | 6/2003 | Hines .......................... 717/135 |

* cited by examiner

*Primary Examiner*—Joseph P. Hirl
(74) *Attorney, Agent, or Firm*—Pillsbury Winthrop Shaw Pittman LLP

(57) ABSTRACT

A system and method by which novel, malicious execution traces may be detected by applying a combination of finite automation and heuristic analysis techniques. Such execution traces may be obtained by instrumenting system-level operating system calls, as well as by other techniques, such as, but not limited to, reading error log files, such as Windows NT event logs. With proper instrumentation, known good and known malicious programs may be run and their execution traces monitored. From such monitoring, a model may be derived, which can indicate those execution traces typically associated with malicious software. With this information, novel malicious programs which invoke execution traces similar to known malicious traces may be detected, and such programs may be stopped before significant damage can occur.

19 Claims, 4 Drawing Sheets

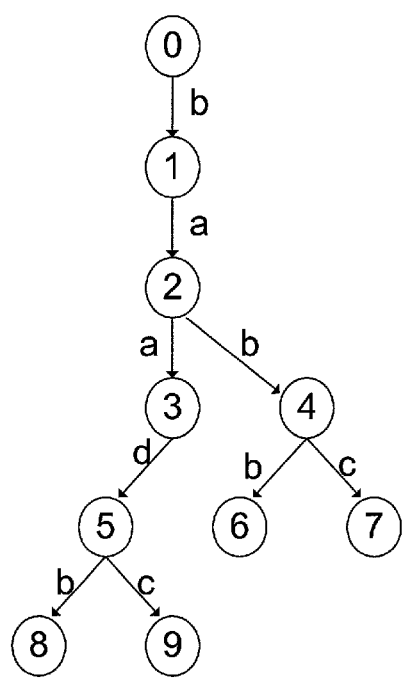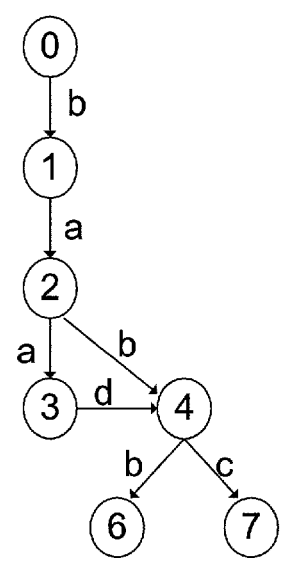
FIG. 2A
FIG. 2B

SYSTEM AND METHOD FOR MINING EXECUTION TRACES WITH FINITE AUTOMATA

This application claims the benefit of U.S. Provisional Application No. 60/233,475 filed Sep. 19, 2000, which is herein incorporated by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

1. Field of the Invention

The present invention relates to the field of computer software, and, in particular, the invention provides a system and method by which malicious or failing software may be detected before such software can cause significant damage.

2. Background of the Invention

Host-based intrusion detection systems monitor and analyze user and software audit data captured on a host machine. Captured data can include user data such as keystrokes, login/logout times, operational profiles, or programs run during a session. Captured data can also include program behavior data such as system calls or internal program states of monitored programs.

There are two general types of intrusion detection algorithms used in host-based intrusion detection: misuse detection and anomaly detection. Misuse detection systems are those that fall into the category of "signature based" systems. That is, they work by comparing data captured online with signatures of known attacks stored in a database.

Advantages of misuse detection include a high certainty rate in detecting well-known attacks, and a low false positive rate. A major misuse detection system drawback, however, is that misuse detection systems cannot detect novel attacks, or, in some cases, even slight variants of well-known attacks. As a result, misuse detection systems are completely reactive to computer misuse, and must be updated often to be able to detect the latest well-known attacks against systems.

Unlike misuse detection, anomaly detection is designed to directly address the problem of detecting new or novel system attacks. To accomplish this, anomaly detection techniques do not scan for specific patterns, but rather compare current activities to statistical models of past behavior, often using what is termed an equality matching approach. The equality matching approach flags as anomalous any activity that sufficiently deviates from the statistical model, thereby allowing such activity to be evaluated as a possible threat.

Although anomaly detection is powerful in that it can detect novel attacks, anomaly detection also has its drawbacks. One of the most significant disadvantages of anomaly detection systems is the comparatively high rate of false alarms. Any significant baseline deviation can be flagged as an intrusion, thus any non-intrusive behavior that falls outside the normal range can also be labeled as an intrusion—resulting in a false positive. In spite of the potential anomaly detection drawbacks, the ability to detect novel attacks makes anomaly detection a requisite if future, unknown computer system attacks are to be detected.

Due to these advantages, anomaly detection is increasingly undergoing research. This research has primarily focused on program-based intrusion detection. The premise of program-based intrusion detection is that there are certain behaviors that are characteristic (or uncharacteristic) of individual programs. Such behaviors can include file input/output (I/O), requests for more memory, or any other action that requires computer resources. For example, the behavior of the program tar—which normally is non-interactive and affects files—is markedly different from that of the program lynx—which normally is very interactive but does not affect files. When viewed from this perspective, almost every program has some externally visible behavior.

In addition to differences in user-level functionality, programs also exhibit distinguishing characteristics and traits at the system level. For example, the interaction between an operating system and a program that performs complex computations will be different from those between the same operating system and a program that performs extensive disk I/O. System-level monitoring also tends to capture user-level interactions, as all interactions between a program and a user go through the operating system at some level. Thus system-level monitoring can capture user interactions in addition to actions that are normally transparent to the user (such as requesting more memory), thereby creating an accurate process behavior profile.

System-level monitoring can be achieved through various techniques, including adding instrumentation to programs which monitors and records internal program states, or adding instrumentation to an operating system to monitor and record external system calls made by a program. In general, it is more attractive to use auditing capabilities provided by the operating system, because this does not require instrumentation of every application installed on a computer. In addition, profiles can be directly created for all software, including commercial off-the-shelf (COTS) software. Examples of such auditing systems include Strace, for various UNIX-based operating systems, which allows monitoring of both system calls made by a given process and values returned by such system calls, and the Basic Security Module (BSM) implemented the Sun Microsystems' Solaris operating system, which can recognize and log the use of 243 built-in system calls that can be made by an individual process. By logging the use of such hooks, Unix and Solaris programmers can profile observable process behavior.

A normal process behavior profile is built by first implementing a "training phase." During a training phase, the intrusion detection system (IDS) records audit information generated by a program under "normal usage." Once an IDS has created this profile, subsequent program behavior can be compared to the profile; if a deviation is noted, then an intrusion flag is raised.

Some research has been conducted which indicates that system-level, program-based anomaly detection utilizing an equality matching approach is a viable option for recognizing malicious behavior as anomalous under Unix. This approach consists of condensing an audit trace into a series of discrete events, and then memorizing every sequence of n events (for some n) that is seen in the training data. Later, a process is flagged as being potentially intrusive if its execution trace contains one or more sequences of length n that do not appear in the database of memorized sequences. Despite the simplicity of the approach and the high detection levels, it does not record the context in which a sequence of system calls occurred, and this can be a disadvantage. A given sequence of system calls may indicate an intrusion in one context, and yet be perfectly normal in another context. When an equality matcher encounters such a sequence in its training data, there is a drop in its performance. Overall, past research indicates that an equality matcher only converges slowly to a good solution as increasing amounts of training data are supplied.

SUMMARY OF THE INVENTION

The present invention attempts to reduce the number of false positive reactions generated by anomaly detection systems by providing a system that models long-term dependencies between audit events. This is done by modeling normal behavior with a finite state automaton. The present invention further applies a similar technique to misuse detection systems by modeling intrusive behavior; as a result, variations of existing attack signatures may also be recognized as an attack.

Some aspects of the present invention can be seen as similar to a data mining system; that is, a system for finding useful features in a corpus of training data. However, typical data-mining systems are not meant to collect features for a specific classification task. Instead, they use unlabeled data and search for nuggets of information that seem interesting, to be used by people who initially did not know the type of data for which they are looking.

Most data-mining systems also do not use sequential data; those that do generally look for frequent episodes in the data. Some in the prior art have also used finite automata, or finite state machines (FSM), to describe data types to be flagged, but those automata are not built automatically from the data. The present invention may identify features based on their use of different transitions in a single finite automaton, which differs from other known data mining approaches.

The present invention may also utilize a data-mining technique that focuses on finding features useful for a specific task. In a preferred embodiment, such tasks may include, but are not limited to, identifying program traces that reflect undesired behavior.

When it is used for data-mining, the present invention further differs from earlier intrusion detection and failure prediction work by employing a novel feature extraction technique. The system implemented in the present invention utilizes a finite automaton that is automatically constructed from program profiles. This finite automaton has specially marked transitions that, according to the training data, are only exercised by bad execution traces. To create such automata, the present invention includes profiles of not only benign programs, but also malicious programs. This can improve potential detection accuracy by allowing the present invention to zero in on features that are known to reflect undesired behavior.

Furthermore, this technique can infer the state of the program being monitored, while those in the prior art typically assume that program states are explicitly contained in the training data. Finally, unlike many in the prior art, the present invention does not require access to source-code, but instead monitors processes at the system level.

The present invention advantageously provides systems and methods for automatically building a tree of execution traces from data collected from an actual software execution. The invention further provides systems and methods for automatically combined nodes in a tree. Unlike prior systems, the present invention uses empirical data to build a finite state automaton rather than relying upon specifications derived from the software.

The present invention further provides systems and methods for increasing reliability for software systems through improved system security and/or system availability.

In another aspect of the present invention, a system and method for training and building the finite automaton includes using known "bad" execution traces. In this manner, the present invention can be used for misuse detection in an intrusion detection system.

BRIEF DESCRIPTION OF THE DRAWINGS

FIG. 2A is a schematic block diagram of a finite automaton in tree form.

FIG. 2B is a schematic block diagram of the finite automaton illustrated in FIG. 2A in which states 4 and 5 have been merged.

DETAILED DESCRIPTION OF THE INVENTION

Figure 1:
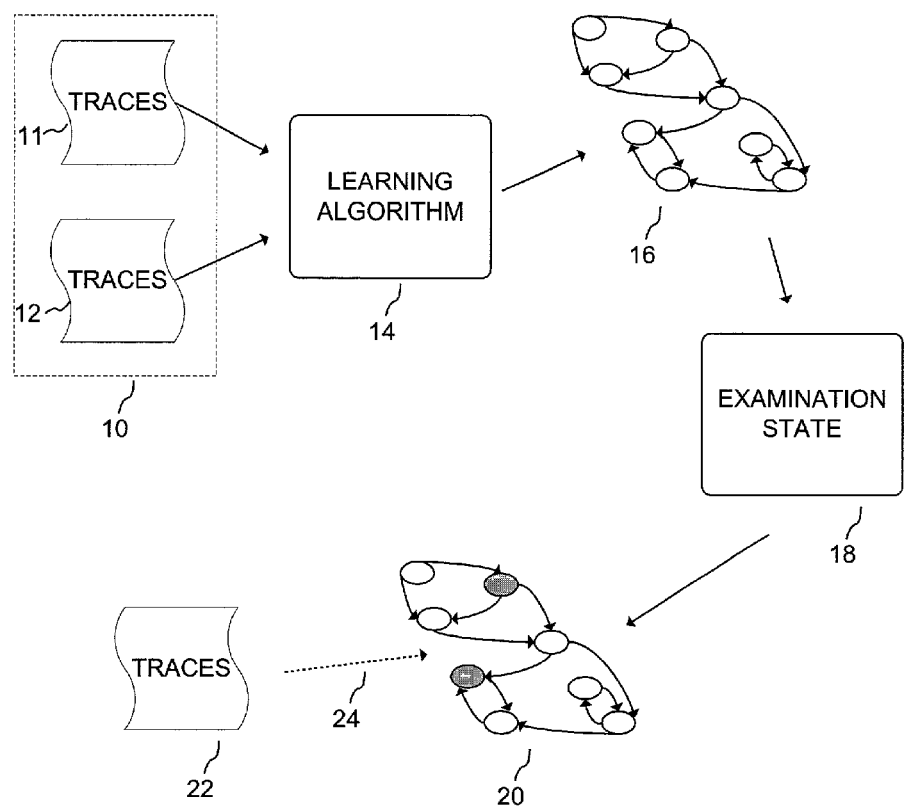
FIG. 1 is a schematic block diagram illustrating a high-level overview of the present invention.

The present invention can determine when an executing program has performed, or is about to perform, an undesired behavior. In a preferred embodiment, the present invention may detect a program or component that is about to perform a malicious action (e.g., do something contrary to an information system security policy). In an alternative embodiment, the present invention may detect a program or component that is about to fail (e.g., do something contrary to its specification) or may cause a failure in another component. FIG. 1 provides an overview of the present invention. The present invention begins with a set of execution traces 10, or monitored execution actions. There may be a single set of traces reflecting only normal behavior. There may alternatively be two sets of execution traces, one of which reflects normal behavior, while the other reflects undesired behavior. In FIG. 1, the normal traces are represented by traces 11, and that undesired behavior (if used in training) is represented by traces 12. Typically, an execution trace is a record of events that occur during program (or process) execution. By way of example, without intending to limit the present invention, an execution trace may reflect system calls made by the executing program, though there need not be a one-to-one mapping between system calls and execution trace event records.

In a preferred embodiment, execution traces may be divided into two groups: those that do not reflect undesirable behavior (illustrated by trace 11 in FIG. 1), and those that are suspected of causing or indicating undesirable behavior (illustrated by trace 12 in FIG. 1). Both trace 11 and trace 12 may contain execution traces from one or more programs. These execution traces may be used by a learning algorithm 14 to automatically build a finite automaton 16.

In a preferred embodiment, a mapping may exist between execution trace events and finite automaton transitions so that states and transitions "exercised" by such traces may be defined. By way of example, without intending to limit the present invention, finite automaton states or transitions may correspond to execution trace events. This is illustrated in more detail by FIGS. 2A and 2B.

In FIGS. 2A and 2B, the transitions of a finite automaton are labeled with the events occurring in an execution trace. For the purposes of the present invention, it may be said that that each trace "exercises" some portion of a finite automaton. By way of example, without intending to limit the present invention, suppose the edges of a finite automaton are labeled with possible execution trace events. A certain series of automaton transitions may be "exercised" if the labels of those transitions form the same sequence of events as are seen in an execution trace. Thus, in FIG. 2A, the string "baadb" exercises the leftmost path of the automaton (i.e.

moving from node 0 to node 1, node 1 to node 2, node 2 to node 3, node 3 to node 5, and node 5 to node 8).

Referring again to FIG. 1, examination stage 18 performs finite automaton examination using various algorithms. Algorithms within examination stage 18 may determine those transitions and/or states that are only exercised by traces associated with undesirable behavior, and may label such transitions as bad. Such evaluation (which may be regarded as part of training) and labeling may be part of the same algorithm, or an automaton may be evaluated based on multiple algorithms. Such evaluation may result in labeled finite automaton 20, as shown in FIG. 1.

Once an automaton has been appropriately labeled, it can be used to detect undesirable behavior in new execution traces 22, as shown in FIG. 1. If such an execution trace exercises an undesirable transition and/or state, then the present invention may label the execution trace as undesirable. (In FIG. 1, dotted line 24 is used to denote that execution trace 22 is being acted on by the finite automaton 20, not being used to create it).

As indicated above, examination stage 18 of FIG. 1 involves examining finite automata derived by learning algorithm 14, and labeling those program execution traces associated with undesirable behavior. Such undesirable behavior may include, but is not limited to, malicious behavior that programs might perform, such as providing an undesired method of entry into the system to unauthorized users, damaging system resources, or elevating user privileges. Program execution trace examinations conducted as part of the present invention may employ modified data mining techniques.

Data mining techniques may be advantageous, as any process execution trace examination should include the extraction of process execution trace features and the states associated with such features. To extract such features, training data containing examples of malicious and benign execution traces may be combined to create an optimized FSM. Once such an FSM has been created, data mining techniques may identify those transitions that appear only in malicious execution traces.

After such an FSM has been created and malicious execution traces have been identified, novel execution traces may be compared to the FSM, and a novel execution trace exercising a transition associated with undesirable behavior may be flagged as malicious.

In addition, an execution trace may be flagged as malicious if it is rejected by the finite automaton. Some states of the automaton are accepting states, and if the series of transitions exercised by an execution trace ends in an accepting state, then that trace is accepted. Otherwise, the trace is rejected. In the preferred implementation, all states of the finite automaton are accepting states, but an execution trace can still be rejected if it fails to exercise the transitions on any path through the finite automaton. This method for detecting malicious executions can still be used if none of the training data reflects malicious executions, or if examination stage 18 examining finite automaton 16 is not performed.

Third, anomalous traces may be identified by using the FSM to aid in devising a statistical description of the training data. A new execution trace is flagged as being anomalous if it deviates too greatly from the statistical norms derived from the training data.

Implementation Details

Preliminary Definitions

The following definitions are provided to define terms used in the present description of embodiments of the invention.

1. A finite automaton is a tuple $(Q, \Sigma, \delta, q_0, F)$, where $Q$ is a set of possible states, $\Sigma$ is a set of symbols comprising the input alphabet, $\delta$ is a function mapping $Q \times \Sigma$ to $2^Q$ (where $2^Q$ denotes the set of all subsets of $Q$), $q_0$ is the start state, and $F$ is a set of final states. Informally, the finite automaton has a set of states, representing a system that is in one of those states at any given time. The states are interconnected by labeled transitions, and when we see an input symbol, we are allowed follow any transition out of the current state and enter a new state, as long as the label of that transition is the same as the input symbol we have just seen.

2. A transition is a triple in the set $Q \times \Sigma \times 2^Q$, and the set of transitions associated with a finite automaton are the triples $<p,a,q>$ such that $q \in \delta(p, a)$. We will also say that $p$ is the source of this transition and that $q$ is its destination, and that the transition starts at $p$ and ends at $q$. If the transition $<p, a, q>$ exists in a finite automaton, then we will sometimes say that $q$ is a child of $p$.

3. We also define $\delta^*$ to be the transitive closure of $\delta$, as follows: if the symbols in the string s are $a_1, a_2, \ldots a_n$ (in that order), then $\delta^*(q,s) = \delta(\ldots \delta(\delta(q,a_1),a_2), \ldots, a_n)$. Informally, $\delta^*(q,s)$ is the set of states that we reach when we traverse the finite automaton by following the labeled transitions, choosing each label according to the next symbol in the string s. A string of symbols in s in $\Sigma^*$ is accepted by the finite automaton if and only if $\exists\ q : q\ EF \in F\hat{}\delta^*(q_0,s)=q$. Here, $\Sigma^*$ denotes the set of all strings that can be formed using symbols from $\Sigma$.

4. When discussing deterministic finite automata (for which $\delta(q,a)$ contains at most one state for any q and a), we will overload the $\delta$ notation and use $\delta(q, a)$ to denote the state p such that $\delta(a, a)=\{p\}$ (where $\{p\}$ denotes the set that contains only p). $\delta^*$ is overloaded in the same way.

5. A leaf is a node p for which $\delta(p,a)$ is the empty set for all $a \in \Sigma$.

6. Given a set of strings S, the prefix tree of S is a deterministic, acyclic finite automaton with the further property that, for any state q, other than the start state, there is at exactly one state p and at most one symbol a such that $\delta(p, a)=q$. There is no p or a such that $\delta(p,a)=q_0$. Informally, the prefix tree has the shape of a tree. For each $s \in S$, either $\delta^*(q_0,s)$ is a leaf, or s is a prefix of some other string t such that $\delta^*(q_0, t)$ is a leaf. Informally, the strings in S can be represented by the edge labels on a path through the tree that starts at the root and ends at a leaf.

7. An execution trace is description of actions that a program took during a particular execution. We don't specify what information is contained in the execution trace, but we say that the execution trace can exercise certain parts of certain finite automata. The precise meaning of this is implementation-dependent, but in the preferred embodiment, and execution trace is a string of symbols, and the same symbols form the alphabet of the finite automaton. In the preferred embodiment, the execution trace s exercises a state p if there is some prefix r of s such that $\delta^*(q_0,r)=p$. The trace s exercises a transition rule $\delta(q, a)$ if s has a prefix r of length k (for some k) such that $\delta^*(q_0,r)=p$, and if the $k+1^{st}$ symbol in s is a. Analogously, the execution trace s exercises a transition rule $\delta^*(p, t)$ if s has a prefix r of length k (for some k) such that $\delta^*(q_0,r)=p$, and if the $k+1^{st}$ through k+nth symbols in s (for some n) form the string t.

8. The number of times a state p in a finite automata is exercised by a string s is the number of unique values of k for which s has a prefix r of length k such that $\delta^*(q_0,r)=p$. Analogously, the number of times that a string exercises a transition $\delta^*(p,t)$ is the number of unique values of k for which s has a prefix r of length k such that $\delta^*(q_0,r)=p$, and if the k+1$^{st}$ through k+nth symbols in s (for some n) form the string t. Informally, the number of times a string exercises a state is the number of times we hit that state while traversing the finite automaton according to the symbols in s. Likewise, the number of times s exercises a transition is the number of times we hit that transition during the same traversal.

9. A training sample is a set of execution traces.

10. If s is a string and p is a state in the finite automaton, then P(s|p) is the probability of seeing a string that exercises the transition $\delta^*(p,s)$. It only makes sense to speak of such a probability if certain assumptions are made about the way strings are selected (for example, there must actually be a probability law governing the selection of strings). However, this assumption is not a part of the invention itself, and discussions involving probabilities simply refer to specific embodiments of the invention or to specific environments in which the invention could be used.

11. The estimated probability (based on a training sample S) of a string s, given that we are in a state q, is denoted, and is defined as follows:
   a. Let $n_q$ denote the number of prefixes of training examples that exercise the state q. Informally, $n_q$ is the number of times we hit state q if we traverse the prefix tree by following the labels given in the training example.
   b. Let $m_{q,r}$ denote the number prefixes of training examples that exercise the transition rule $\delta^*(q,r)$. Informally, $m_{q,r}$ is the number of times we hit state q, and then notice that the next l characters in the current training sequence spell out the string s, for some l.
   c. Set $\hat{p}(x|c)=m_{x,c}/n_c$.

By way of example, without intending to limit the present invention, suppose training data contains the strings "baadb," "baadc," "babb," and "babc," and we are estimating the empirical probabilities for suffixes of length 2 starting at node 2 in FIG. 2A. Node 2 is the node reached by making the transitions "b" and then "a," and the next two symbols are "ad" for two of the training strings ("adb" and "adc"), "bb" for the third, and "bc" for the last. Therefore, the empirical probability estimates at node 2 would be 0.5 for the string "ad," 0.25 for each of "bb" and "bc." If, as in the data extracted by a particular implementation from security logs generated by the Windows NT operating system, there are 106 event types, the empirical probability estimate would be zero for each of the other $106^2-3$ combinations of 2 symbols (as 106 event types may be extracted from Windows NT security audit logs).

12. For any positive number d, the estimated $L_d$ distance between two states p and q is defined as: The intuition behind all of this is that we estimate a probability density for all the strings that we might see when we are in state s by estimating the probability of each possible string individually. We estimate such a probability density for each node in the prefix tree and possibly each state in the finite automaton. In alternate implementations, the probability densities might be estimated by other means. The $L_d$ distance between two states quantifies the dissimilarity between (on one hand) the probability density for the set of strings given that we are in state p, and (on the other hand) the probability density for the set of possible strings given that we are in state q. Technically, the above procedure is a technique for estimating the $L_d$ distance between two probability densities, and when we want to emphasize this, we will refer to this as the estimated $L_d$ distance.

Constructing Finite Automata From Execution Traces

We now turn to implementations of the algorithm for constructing a finite state machine from execution traces.

An FSM may be constructed using a state merging algorithm. State merging algorithms typically start with a prefix tree (also called an acceptor tree), which describes training data. Each training data event sequence may correspond to edge labels on a prefix tree path, starting at the root, and, if there is a unique end symbol, ending in a leaf. This construct is referred to as a prefix tree, because every prefix of every sequence is also represented by a path starting at the root. FIG. 2A illustrates a prefix tree for the sequences, or "strings," "baadb," "baadc," "babb," and "babc."

Once an appropriate prefix tree has been developed, a learning algorithm may be applied to such a prefix tree. We will refer to the prefix tree as a finite automaton. The nodes of the tree correspond to the states of the finite automaton, with the root node of the tree serving as the start state, and all nodes on the tree except the root serving as accepting states. The edges in the prefix tree correspond to the transitions of the finite automaton, and the set of possible edge-labels in the prefix tree corresponds to the alphabet of the finite automaton.

A learning algorithm may selectively merge nodes in the finite automaton. This is illustrated in FIG. 2B. In FIG. 2B, states (also referred to herein as "nodes") 4 and 5 of the finite automaton shown in FIG. 2A have been merged, as the subtrees rooted at states 4 and 5 are the same. After merging two states, the state merging algorithm may continue by choosing another pair of states to merge, or it may halt. The state merging algorithm illustrated in FIG. 2B is one of several possible techniques. State merging algorithms differ in their choices of which states will be merged, including a decision not to merge certain states with others. In addition, finite automata to be used for intrusion detection may be created by completely different means, especially when the aim is to identify specific transitions that indicate malicious behavior.

Figure 4:
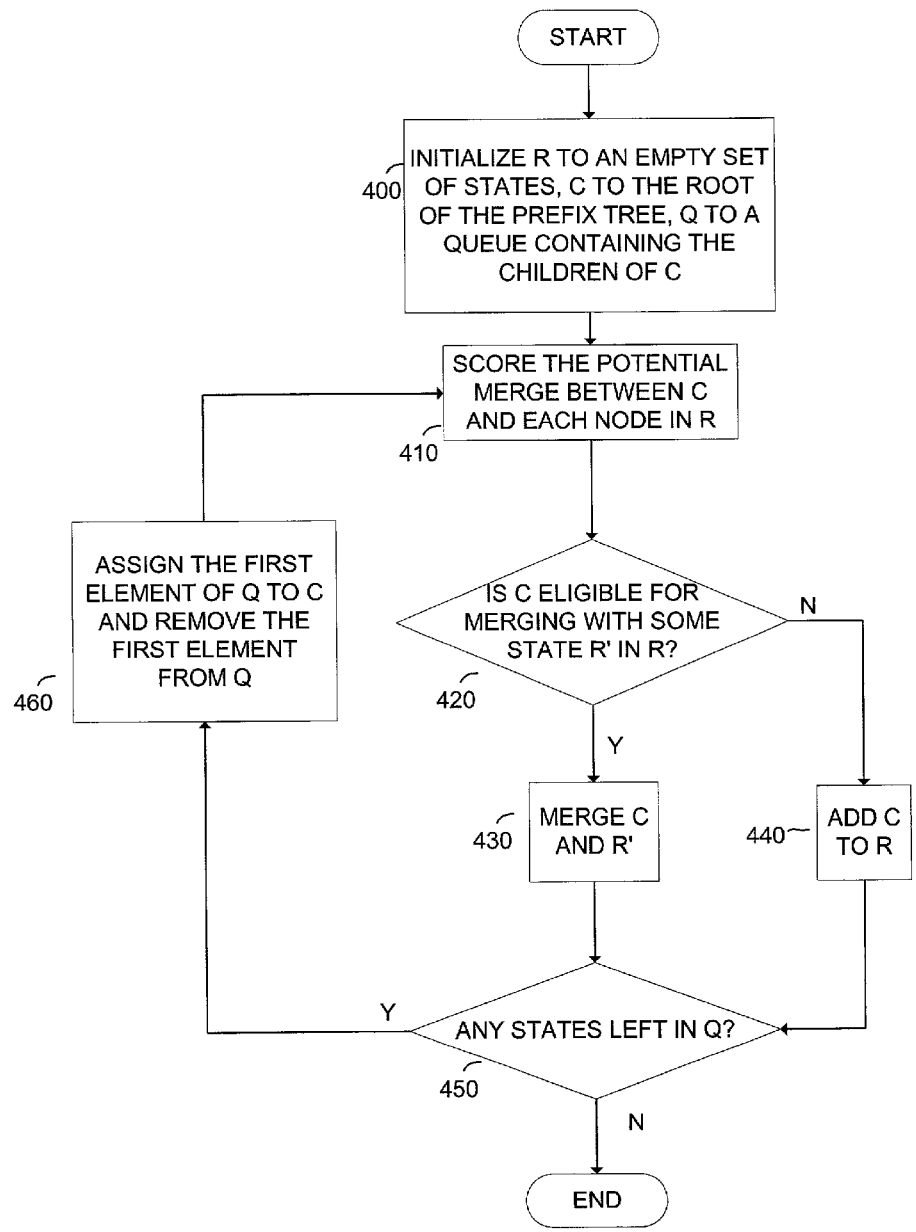
FIG. 4 is a flow diagram showing a state merging algorithm according to an embodiment of the present invention.

State merging algorithms vary in how thoroughly they explore the possible merges between states. At one extreme, a state merging algorithm may perform a breadth first traversal of the prefix tree, examining each node and deciding which other node it should be merged with. This implementation of a state merging algorithm is illustrated in FIG. 4. Starting in Block 400, the process performs various initializations, including initializing R to any empty set of states, initializing C to the root of the prefix tree, initializing Q to a queue containing the children of C. In Block 410, a score is computed for the potential merge between C and each node in R. Next, in Block 420, the process checks to see if C is eligible for merging with some state R' in R. If so, in Block 430 C is merged with R'. Otherwise, in Block 440, C is added to R. In Block 450, the process checks to see if any states remain in Q. If there are no states remaining, the process ends. If states are remaining, the process moves on to Block 460 and it assigns the first element in Q to C, and removes the first element from Q. The process the returns to Block 410 where the potential merge value between C and R is computed.

Conceptually, one can think of the finite automaton as being separate from the suffix tree for such an algorithm, with nodes from the prefix tree being transformed into states of the finite automaton. This transformation can happen in two ways, namely promotion and merging.

Promotion of a node c into the finite automaton may be performed according to the following algorithm in an embodiment of the present invention:

1. Create a new state, c', in the finite automaton.
2. Record the fact that state c' in the finite automaton corresponds to node c in the prefix tree. This may be done, e.g., by placing a pointer to c' into the data-structure describing c.
3. Find the node in the prefix tree that is the parent of c. This may be done, e.g., by first following a pointer from the data-structure representing c to the data-structure representing the parent of c. We will refer to the parent of c in the prefix tree as d.
4. Find the state in the finite automaton that corresponds to d. This may be done by following a pointer from the data-structure representing d to the data-structure that represents the corresponding state in the finite automaton. We will call this state d'. Note that d' is guaranteed to exist because each node we encounter during the breadth-first traversal of the prefix tree is made to correspond to some state in the suffix tree (as will be seen), and because the breadth-first traversal itself guarantees that d, being the parent of c, will be visited before c.
5. Find the label of the edge connecting d and c. Add to the finite automaton a transition from d' to c', and give that transition the same label as the edge leading from node d to node c in the suffix tree.

Merging a node c in the prefix tree and a state b' in the finite automaton may be performed according to the following algorithm in an embodiment of the present invention:

1. Record the fact that state b' in the finite automaton corresponds to node c in the prefix tree. This can be done using pointers as above, without deleting and previously recorded correspondences between nodes in the prefix tree and states in the suffix tree.
2. Find the node d in the prefix tree that is the parent of c.
3. Find the state d' in the finite automaton that corresponds to d.
4. Find the label of the edge connecting d and c. Add to the finite automaton a transition from d' to b', and give that transition the same label as the edge leading from node d to node c in the suffix tree.

Merging can result in the finite automaton becoming nondeterministic, because there may be more than one transition starting at d' with the same label. If this happens, and if it is desired for the finite automaton to be deterministic instead, we can use the following procedure to restore determinism. (However, the invention does not require that the automaton be deterministic.) An algorithm for recursive merging to restore determinism at node d is given by the following pseudo code:

```
for each z that is the label of a transition starting at d:
    if there is more than one transition labeled z starting in state d, then:
        let N denote the set of states reached by the transitions labeled z starting at state d,
        create a new state, f;
        for each transition t starting at some node in N:
            let g be the state that is the destination of the transition t,
            add to the finite automaton a transition from state f to state g, and give this new transition the label z,
        end for;
        for each transition t ending at some node in N:
            let g be the state that is the source of the transition t,
            add to the finite automaton a transition from state g to state f, and give this new transition the same label as t,
        end for;
        delete all transitions leading to a state in the set N, all transitions ending in a state in the set N, and all states in the set N;
        apply the procedure for restoring determinism recursively to f;
        end if;
    end for.
```

At the other extreme, an optimality condition is devised for the entire tree, and the learning problem is viewed as a global optimization problem (with any merger or separation of nodes being permissible at any time).

Blue-Fringe Algorithms

Blue-fringe algorithms are a class of state merging algorithms that are at a midpoint between these extremes. A blue-fringe algorithm partitions the set of nodes into three sets, which are distinguished by color (red, blue, and white). Nodes may be assigned a red color when such nodes can no longer be merged with nodes higher in the tree. A blue color may be assigned to those nodes that are children of red nodes. Blue nodes are candidates for merging with red nodes. White nodes are those that are not yet merging candidates, and have not been merged. In addition, three invariant rules are applied: 1) red nodes form an arbitrary graph but cannot be merged with one another; 2) each child of a red node is either red or blue; and 3) each blue node is the root of a tree of zero or more white nodes.

In a blue-fringe algorithm, merging, promotion, and determinization are slightly different than for the simple algorithm given earlier. A promotion consists of changing a state's color from blue to red (only blue states can be promoted) and changing the color of each child of the promoted state to blue (the promoted state being the blue state whose color was changed to red).

Merging between a blue node c and a red node b may be accomplished as follows in a blue-fringe algorithm:

1. Find the node d in the prefix tree that is the parent of c.
2. Find the label of the edge connecting d and c. Add to the finite automaton a transition from d to b, and give that transition the same label as the edge leading from node d to node c.
3. For every transition <c,a,q> in the automaton (that is every transition starting at c, labeled a (for some a) and leading to the state q (for some q):
   a. Add the transition <b,a,q> to the finite automaton if it doesn't already exist.
   b. Delete the transition <c,a,q>.
   c. If q is a white state, make it blue.
4. Delete the state c.

As before, it may be necessary to restore determinism to the automaton after a merge. This can be accomplished in the same way as in the previously presented determinization procedure, except that the node colors have to be updated. An algorithm for recursive merging to restore determinism at node d is given by the following pseudo code:

```
for each z that is the label of a transition starting at d:
    if there is more than one transition labeled z starting in state d, then:
        let N denote the set of states reached by the transitions labeled z
```

-continued

```
    starting at state d;
create a new red state, f;
for each transition t starting at some node in N:
    let g be the state that is the destination of the transition t,
    add to the finite automaton a transition from state f to state
        g, and give this new transition the label z,
    if g is white, make it blue,
    end for;
for each transition t ending at some node in N:
    let g be the state that is the source of the transition t,
    add to the finite automaton a transition from state g to state
        f and give this new transition the same label as t,
    end for;
delete all transitions leading to a state in the set N, all transitions
    ending in a state in the set N, and all states in the set N;
apply the procedure for restoring determinism recursively to f;
    end if;
end for.
```

Figure 3:
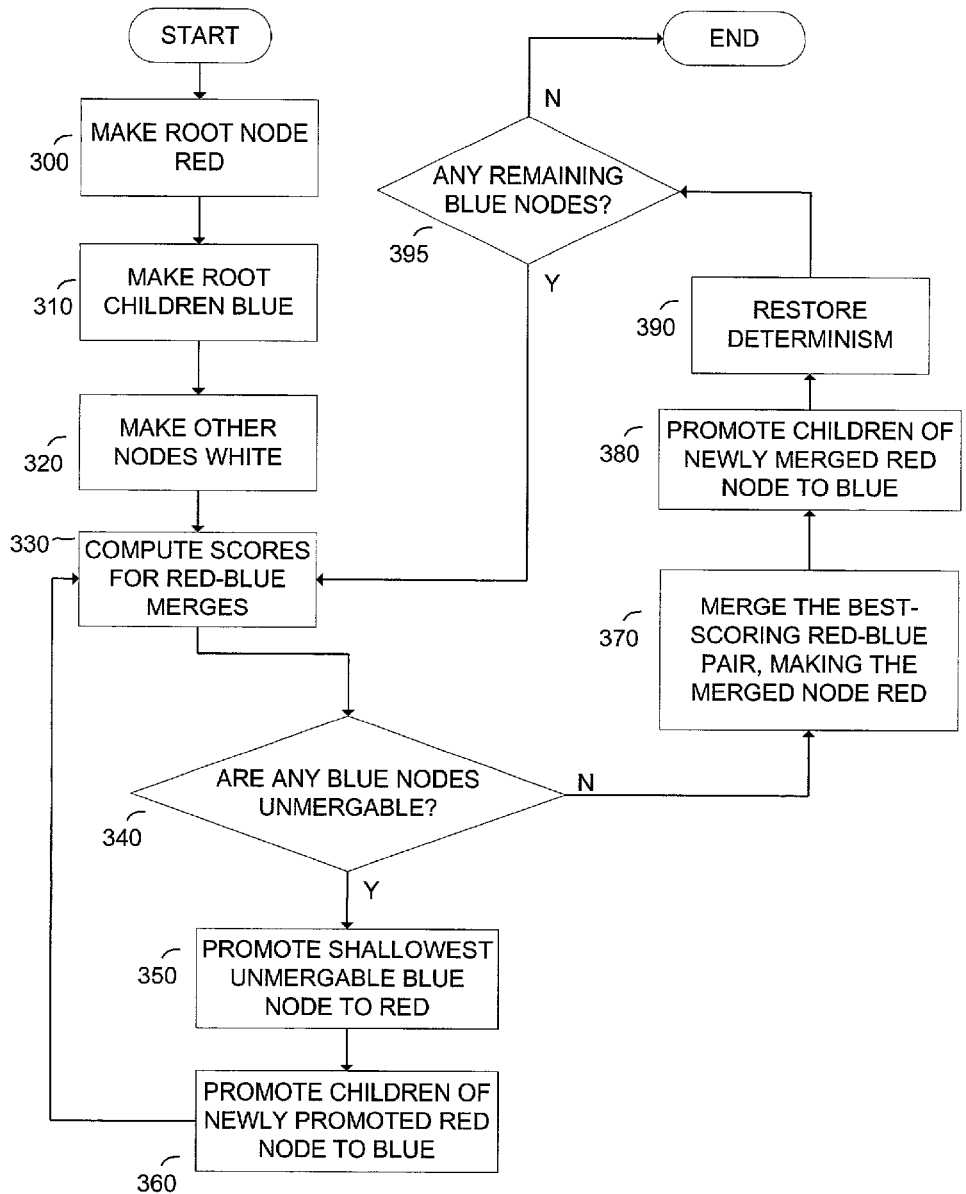
FIG. 3 is a flow diagram showing a process by which state mergers may be evaluated in a blue-fringe algorithm according to an embodiment of the present invention.

FIG. 3 illustrates a process by which state mergers may be evaluated in a blue-fringe algorithm. As illustrated by Block 300, the algorithm begins by making the root node red. The algorithm next makes all children of the root node blue (Block 310), and any remaining nodes white (Block 320). In Block 330, a score is calculated for each red-blue pair (a pair of states consisting of a red node and a blue node) based on the compatibility of the two nodes. In a preferred embodiment, a score may be based on an $L_d$ distance between histograms generated for the two nodes ("b" and "c") to be merged. In Block 340, the process checks to see if any blue nodes are unmergable. If so, the process moves on to Block 350 where the shallowest unmergable blue node is promoted to red. Next, in Block 360, the children of the newly promoted red node are promoted to blue. At this point, the process returns to Block 330 as shown in FIG. 3. Back in Block 340, if there were no unmergable blue nodes, the process moves on to Block 370 where the best-scoring red-blue pair are merged resulting in the merged red node. In Block 380, the children of the newly merged red node are promoted to blue. In Block 390, determinism is restored, and in Block 395, the process checks to see is any blue nodes are left. If so, the process returns to Block 330, otherwise, the process ends.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computerized method for detecting anomalous behavior in an executing software program, said method comprising the steps of:
    generating a normal execution trace for the software program;
    applying a learning algorithm to the normal execution trace to build a finite automaton;
    applying an examination algorithm to the finite automaton to identify undesirable transition states in the finite automaton and to create a labeled finite automation; and
    applying the labeled finite automaton to an execution trace associated with the executing software program to identify undesirable behavior.

2. The method of claim 1, wherein application of the learning algorithm occurs during a first learning, phase and application of the examination algorithm occurs during a second, examination phase and the learning phase occurs before and independently from the examination phase.

3. The method of claim 1, wherein application of the labeled finite automaton to the execution trace is performed to identify undesirable behavior in a execution trace.

4. The method of claim 3, wherein the undesirable behavior comprises the undesirable transition.

5. The method of claim 1, wherein the finite automaton comprises a tuple.

6. The method of claim 5, wherein the tuple comprises a set of possible states, a set of symbols comprising the input alphabet, a mapping function, a start state, and a set of final states.

7. The method of claim 5, wherein the tuple comprises a set of states interconnected by labeled transitions.

8. The method of claim 1, wherein the finite automaton comprises a prefix tree.

9. The method of claim 8, wherein the prefix tree comprises a plurality of nodes.

10. The method of claim 9, wherein the plurality of the nodes of the prefix tree correspond to states of the finite automaton.

11. The method of claim 10, wherein one of the plurality of nodes comprises a root node, with the root node serving as a start state.

12. The method of claim 11, wherein a remainder of the plurality of nodes comprise accepting states.

13. The method of claim 9, wherein the learning algorithm selectively merges nodes in the finite automaton.

14. The method of claim 1, wherein the learning algorithm comprises a state merging algorithm.

15. The method of claim 1, further comprising flagging the execution trace associated with the executing software program as malicious if the execution trace associated with the executing software program is rejected by the finite automaton.

16. The method of claim 1, wherein the execution trace associated with the executing software program is rejected if it does not end in an accepting state.

17. The method of claim 1, wherein the undesirable behavior comprises at least one of providing an undesired method of entry into the system to unauthorized users, damaging system resources, and elevating user privileges.

18. The method of claim 1, wherein the finite automaton is built using empirical data.

19. The method of claim 1, wherein the method is performed by monitoring processes at a system level.

* * * * *